United States Patent
Massey et al.

(10) Patent No.: US 9,598,625 B2
(45) Date of Patent: Mar. 21, 2017

(54) LUBRICATION FOR DRILLING FLUID

(71) Applicant: MJ Research and Development LP, Houston, TX (US)

(72) Inventors: Fred P. Massey, Houston, TX (US); Owen N. Massey, Houston, TX (US)

(73) Assignee: M J Research & Development, LP, Houston, TX (US)

( * ) Notice: Subject to any disclaimer, the term of this patent is extended or adjusted under 35 U.S.C. 154(b) by 0 days.

(21) Appl. No.: 14/563,446

(22) Filed: Dec. 8, 2014

(65) Prior Publication Data
US 2015/0159071 A1    Jun. 11, 2015

Related U.S. Application Data

(60) Provisional application No. 61/913,055, filed on Dec. 6, 2013.

(51) Int. Cl.
*C09K 8/06*    (2006.01)

(52) U.S. Cl.
CPC .............. *C09K 8/06* (2013.01); *C09K 2208/34* (2013.01)

(58) Field of Classification Search
None
See application file for complete search history.

(56) References Cited

U.S. PATENT DOCUMENTS

| | | | |
|---|---|---|---|
| 4,212,794 A | 7/1980 | Grodde et al. | |
| H001000 H * | 12/1991 | Patel | C09K 8/28 507/103 |
| 7,968,504 B2 * | 6/2011 | Mosier | C07C 67/03 508/419 |
| 8,193,125 B2 | 6/2012 | Muller et al. | |
| 2014/0144290 A1 * | 5/2014 | Martins | B03D 1/01 75/330 |

OTHER PUBLICATIONS

PCT International Search Report and The Written Opinion; dated Feb. 24, 2015; International Application No. PCT/US2014/069102; International File Date: Dec. 8, 2014.
POTASHCORP.; Purified Phosphoric Acid, H3PO4, Technical Information Bulletin; PotashCorp. 2012; [retrieved on Feb. 2, 2015]. Retrieved from the Internet: <URL: http://www.potashcorp.com/media/PCS_phos_acid_manual.pdf.>entire document.

* cited by examiner

*Primary Examiner* — Jeffrey Washville
(74) *Attorney, Agent, or Firm* — Bracewell LLP; Constance G. Rhebergen; Kevin R. Tamm

(57) ABSTRACT

A drilling fluid lubricant includes a crude tall oil product and a derivative of ricinoleic acid that is at least partially transesterified product. A modified drilling fluid includes a water-based drilling fluid in a range of from about 95 vol. % to about 99 vol. % and a drilling fluid lubricant in a range of from about 0.1 vol. % to about 5 vol. % of the fluid. The drilling fluid lubricant includes a crude tall oil product selected from the group consisting of crude tall oil, distilled tall oil, acid tall oil, fractionated tall oil, and combinations thereof. The drilling fluid lubricant also includes at least partially transesterified derivative of ricinoleic acid product. The product comprises at least partially transesterified derivatives of ricinoleic acid that combined are in a range of from about 88 mole % to about 99 mole % of the product.

12 Claims, No Drawings

LUBRICATION FOR DRILLING FLUID

CROSS-REFERENCE TO RELATED APPLICATIONS

This application claims priority to and the benefit of U.S. Provisional Patent Application No. 61/913,055, entitled "LUBRICATION FOR DRILLING FLUID" and filed on Dec. 6, 2013, the disclosure of which is hereby incorporated by reference in its entirety.

FIELD OF THE INVENTION

This invention relates to an additive for a drilling fluid, and more specifically a composition for improving the lubrication of drilling fluids.

BACKGROUND OF THE INVENTION

During drilling operations from just after initial spudding of a well through completion and initiation of production, drilling fluid or drilling "mud" fills the interior of the formed well bore. Some types of muds are petroleum-based materials. Petroleum-based materials comprise at least 90 weight percent of an oil-based mud (OBM) as a continuous phase. Examples of suitable base petroleum materials include crude oil, a distilled fraction of crude oil, including diesel, kerosene, asphalt, waxes, lubricating oils, mineral oil, and heavy petroleum refinery liquid residues. Typically, a minor part of the OBM comprises water or an aqueous solution that is in the mud as an internal phase. Such water-in-oil emulsions are useful to transport chemicals that are not otherwise useful in the continuous phase. Other optional OBM components include emulsifiers, wetting agents and additives that give desirable physical properties to the mud or treat the well bore wall.

Oil-based muds also include synthetic oil-based muds (SOBMs). Synthetic oil-based muds are crude oil derivatives that have been chemically treated, modified, altered or refined, or combinations thereof, to enhance and promote certain chemical or physical properties and exclude other aspects of typical OBMs. SOBMs are monolithic systems that behave in a manner as if they were an OBM but provide a limited and predictable range of chemical and physical behaviors. In comparison to a distilled fraction of crude oil, which may contain several classes (for example, alkanes, aromatics, and heteroatomics) representing thousands of individual compounds, a SOBM usually comprises one class representing at most tens of individual compounds (for example, ester compounds in a $C_8$-$C_{14}$ range). Examples of useful materials for the base fluid of a SOBM include linear alpha olefins, isomerized olefins, poly alpha olefins, linear alkyl benzenes and vegetable oil- and hydrocarbon-derived ester compounds.

A mud with an aqueous continuous phase—a water-based mud (WBM)—typically comprises water in a range of greater than 50% to about 99% water. Unlike OBMs, WBMs may have a significant portion of hydrocarbons, including materials that would normally serve as the basis for an OBM, as part of the WBM. The base fluid for the water-based systems include fresh water, natural and saturated salt waters, natural or artificial brines, sea water, mineral water, and other potable and non-potable waters containing one or more dissolved salts or minerals. In regions where water is scarce or environmental regulations do not permit the disposal of untreated formation water, recycling recovered formation water from other production sites can provide an inexpensive source for a WBM, especially if the formation water contains salts and minerals that are useful to stabilize clay and shale downhole.

Besides salts and minerals, often other additives are useful in attempting to control the viscosity or inhibition of water-based mud. Common additives include sodium or potassium silicates ("silicate muds") to inhibit shale and seal microfractures that occur during drilling, quebracho ("red mud") and other tannates, ferrochrome lignosulfonate ("lignosulfate mud"), potassium, formate, lignites, phosphates, polyphosphates, gypsum, water-soluble polymers ("polymud"), lime, cellulose and xanthose based polymers, biopolymers, brines, biocides, corrosion inhibitors, foamers and cleaners.

The ability to maintain rotational velocity and fluid flow is a significant attribute of all drilling fluids, but this is especially true when the drilling tools stop their rotation and their introduction/withdrawal movement. Fluid momentum and disturbance of the fluid flow within the well bore by the tools permits suspension of solids, incompatible with the continuous phase liquids and gases to be maintained throughout the course of the drilling fluid flow pathway from the surface, downhole, and then back uphole for recovery and reintroduction. Reduction of fluid momentum due not only to general fluid friction but also friction against the sidewalls and the downhole equipment eventually causes the drilling fluid to settle. To prevent this settling, often it is necessary to continue pumping to the surface or slowly rotating the drilling string to keep the drilling fluid moving to a point where solids do not drop out of the continuous phase and incompatible gases and liquids do not separate.

It is desirable to include with a drilling fluid a composition that can significantly lower the frictional effects of the drilling fluid such that fluid momentum may be maintained with increased ease by action of the drill string or pumping of the drilling fluid to and from the surface. Such a composition would not only provide safer and more predictable operations with the modified drilling fluid, but also energy usage would be significantly reduced. A composition that is also environmentally friendly and that is biodegradable is also advantageous for use in marine and ecologically-sensitive environments.

SUMMARY OF THE INVENTION

The invention includes a drilling fluid lubricant that is a combination of a crude tall oil product preferably having a viscosity of 29 centipoise at a temperature of 25° C. and a pressure of 1 atmosphere and a derivative of ricinoleic acid that is at least partially transesterified product from a reaction of ricinoleic acid with propyl alcohol in the presence of a phosphorus containing acid having a viscosity in a range of from 30 to 500 centipoise at a temperature of 40° C. and a pressure of 1 atmosphere. In an embodiment of the drilling fluid lubricant, the derivative of ricinoleic acid that is at least partially transesterified product contains the following at least partially transesterified derivative of ricinoleic acid according to the general formula depicted in Formula (I):

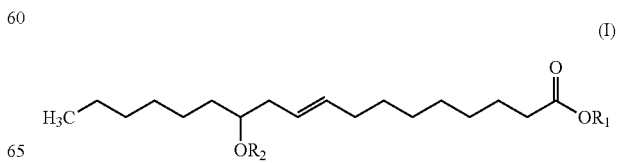

where $R_1$ is selected from the group consisting of a hydrogen atom, a linear, branched, cyclical and polycyclical alkyl radical comprising 1 to 18 carbon atoms, a linear or branched, cyclical and polycyclical alkyl alcohol radical comprising 1 to 18 carbon atoms, or a glyceride radical. $R_2$ is selected from the group consisting of a hydrogen atom, a phosphorous radical comprising 1 to 2 phosphorous atoms, a sulfur radical comprising 1 sulfur atom, or a nitrogen radical comprising 1 nitrogen atom. $R_1$ and $R_2$ are both not hydrogen as this would simply be ricinoleic acid.

In an embodiment, the invention provides for a modified drilling fluid that includes a water-based drilling fluid in a range of from about 95 vol. % to about 99 vol. % of the modified drilling fluid and a drilling fluid lubricant in a range of from about 0.1 vol. % to about 5 vol. % of the modified drilling fluid. The drilling fluid lubricant includes a crude tall oil product. In a preferred embodiment, the crude tall oil product is selected from the group consisting of crude tall oil, distilled tall oil, acid tall oil, fractionated tall oil, and combinations thereof. The drilling fluid lubricant also includes at least a partially transesterified derivative fraction of ricinoleic acid product and optionally comprises ricinelaidic acid (the trans-isomer of ricinoleic acid), ricinoleates, polyricinoleates and combinations thereof. The product comprises at least partially transesterified derivatives of ricinoleic acid that combined are in a range of from about 88 mole % to about 99 mole % of the product.

The combination of the crude tall oil product with the derivative of ricinoleic acid that is at least partially transesterified product in relatively minor amounts is added to a water-based drilling fluid in an amount operable to modify the coefficient of friction inside the drilling fluid and provides a surprising synergetic effect of significantly reducing the coefficient of friction inside the drilling fluid while preserving other characteristics of the fluid such as viscosity.

The drilling fluid lubricant of the invention advantageously has low flammability, is non-reactive, has low toxicity and is biodegradable because it is comprised mostly of fatty acids, fatty acid esters and rosin acids from naturally-derived sources.

In an embodiment, the invention provides for a coiled tubing fluid comprising a crude tall oil product having a viscosity of 29 centipoise at a temperature of 25° C. and a pressure of 1 atmosphere and in a range of from 60 vol. % to 90 vol. % of the coiled tubing fluid; and a derivative of ricinoleic acid that is at least partially transesterified product from a reaction of ricinoleic acid with propyl alcohol in the presence of a phosphorus containing acid having a viscosity in a range of from 30 to 500 centipoise at a temperature of 40° C. and a pressure of 1 atmosphere and in a range of from 10 vol. % to 40 vol. % of the coiled tubing fluid. In some embodiments, the coiled tubing fluid significantly reduces the coefficient of friction inside a coil tube and may be used a friction reducer in oil and gas field operations. In further embodiments, the coiled tubing fluid may be used as a viscosifying agent in oil and gas field operations. In additional embodiments, the coiled tubing fluid may be used in oil and gas well cleanouts and in circulation and deliquification activities.

BRIEF DESCRIPTION OF THE DRAWINGS

No drawings.

DETAILED DESCRIPTION OF THE INVENTION

The Specification, which includes the Summary of Invention, Brief Description of the Drawings and the Detailed Description of the Preferred Embodiments, and the appended Claims refer to particular features (including process or method steps) of the invention. Those of skill in the art understand that the invention includes all possible combinations and uses of particular features described in the Specification. Those of skill in the art understand that the invention is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the invention. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a", "an", and "the" include plural references unless the context clearly indicates otherwise. The referenced elements, components or steps may be present, utilized or combined with other elements, components or steps not expressly referenced. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use.

Spatial terms describe the relative position of an object or a group of objects relative to another object or group of objects. The spatial relationships apply along vertical and horizontal axes. Orientational and relational words including "uphole" and "downhole" and "up" and "down" are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The invention encompasses and bounds smaller ranges of the interval subject to any specific exclusion provided. "Substantially free" means an amount that is not functionally significant or is a trace amount.

When a patent or a publication is referenced in this disclosure, the reference is incorporated by reference and in its entirety to the extent that it does not contradict statements made in this disclosure.

Crude Tall Oil Products

The drilling fluid lubricant includes a crude tall oil product. The preferred crude tall oil product is crude tall oil, refined products of crude tall oil and combinations thereof. The Kraft wood pulping process converts wood chips from sources such as pine and other "soft" wood trees into crude tall oil, wood pulp, black liquor, and crude sulfates of turpentine.

Crude Tall Oil

Crude tall oil (CTO) on a dehydrated basis and depending on its source contains three "classes" of materials: neutral materials, fatty acids and rosin acids. The "neutral" materials are non-acidic in nature, mostly comprising alcohols, including sterols, and polycyclic hydrocarbons. The neutrals comprise a range of from about 5% to about 15% of the CTO. The balance of the CTO, depending on the source material, comprises fatty acids and rosin acids in a ratio of about 2:1 to about 1:3.

Fatty acids found in crude tall oil are a combination of saturated and unsaturated straight-chain acids with an even number of carbon atoms. However, there are small amounts of both branched-chained and odd numbered carbon acids. Fatty acids in CTO include stearic, oleic, non-conjugated linoleic, conjugated linoleic and linolenic acid. The two major acids—oleic and linoleic—comprise from about 75% to about 90% of the fatty acid content of the CTO. In an embodiment, the fatty acid content of a CTO includes 6% palmitic acid, 1% palmitoleic acid, 1% stearic acid, 41% oleic acid, 34% non-conjugated linoleic acid, 6% conjugated linoleic acid, and 11% other acids.

Rosin acids present in crude tall oil include abietic acid, dehydroabietic acid, neoabietic acid, palustric acid, pimaric acid, sandaracopimaric acid and isopimaric acid.

Distilled Tall Oil, Acid Tall Oil and Fractionated Tall Oil

Dehydration, fractional distillation and refining of the crude tall oil products is effective in separating the two major components of CTO—tall oil fatty acids and tall oil rosin acids—into two separate and highly refined products. In some circumstances, sterols and other alcohols are also recovered separately for specialty chemical purposes. The remainder of the CTO after the fatty and rosin acid recovery is known as tall oil pitch. The tall oil pitch is useful for its fuel value and, as an example, is consumed in lieu of hydrocarbon fuels at a Kraft wood pulping facility.

Simple distillation of crude tall oil yields a distilled tall oil (DTO) fraction that has some amount of rosin acids incorporated with the majority fatty acids. DTOs typically have a fatty acid content of less than 90% of the tall oil. In an embodiment, the DTO comprises fatty acids in a range of from about 60% to about 85%, rosin acids in a range of from about 14% to about 37%, and neutrals in a range of from about 1% to about 3%. The specific gravity of the DTO is in a range of from about 0.94 to about 0.95 at 25° C.

Refining crude tall oil while introducing strong acids to removing coloring components forms an acid tall oil (ATO) that is cleaner in appearance but includes more rosin acids. In an embodiment, the ATO comprises fatty acids in a range of from about 50% to about 75%, rosin acids in a range of from about 25% to about 42%, and neutrals in a range of from about 5% to about 8%. The specific gravity of the ATO is in a range of from about 0.99 to about 1.00 at 25° C.

Fractionated tall oils (FTOs) are highly refined tall oil products where the fatty acids and the rosin acids are fractionally distilled from one another. In an embodiment, the FTO comprises fatty acids in a range of from about 90% to about 98%, rosin acids in a range of from about 1% to about 10%, and neutrals in a range of from about 1% to about 10%. The oleic and non-conjugated linoleic acids of the FTO comprise more than about 90% of the fatty acid content, and the oleic acid comprises more than about 50% of the fatty acid content.

The neutral materials in tall oil fatty acid products typically include dimethoxystilbene and abietene hydrocarbons.

Transesterified Derivative of Ricinoleic Acid Product

The drilling fluid lubricant includes a product that comprises a ricinoleic acid derivative that is at least partially transesterified. In some embodiments, the ricinoleic acid derivative is exclusively partially transesterified. The at least partially transesterified derivative of ricinoleic acid has the general formula depicted in Formula (I):

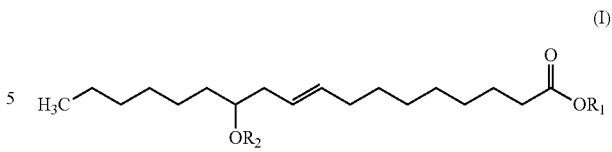

where $R_1$ is selected from the group consisting of a hydrogen atom, a linear, branched, cyclical and polycyclical alkyl radical comprising 1 to 18 carbon atoms, a linear, branched, cyclical and polycyclical alkyl alcohol radical comprising 1 to 18 carbon atoms, or a glyceride radical; where $R_2$ is selected from the group consisting of a hydrogen atom, a phosphorous radical comprising 1 to 2 phosphorous atoms, a sulfur radical comprising 1 to 2 sulfur atoms, or a nitrogen radical comprising 1 nitrogen atom; and where $R_1$ and $R_2$ are both not hydrogen and both not a halogen including fluorine, chlorine, bromine, and iodine.

In an embodiment, the transesterified derivative of ricinoleic acid product is a mixture of at least "partially" transesterified derivatives of ricinoleic acid. As used herein "partially transesterified" refers to compounds that do not undergo transesterification at all available ester (carboxylic acid) sites. Partially transesterified derivatives of ricinoleic acid therefore include derivatives of ricinoleic acid where $R_1$ remains unreacted (carboxylic acid) but $R_2$ is transesterified according to the features of Formula I. Partially transesterified derivatives of ricinoleic acid also include derivatives of ricinoleic acid where $R_1$ is transesterified but $R_2$ remains unreacted (secondary alcohol) according to the features of Formula I. The transesterified derivative of ricinoleic acid product optionally contains "fully" transesterified derivative of ricinoleic acid, where $R_1$ and $R_2$ are not hydrogen and not a halogen but have been replaced through transesterification reactions. Fully transesterified derivatives of ricinoleic acid satisfy the definition of "at least partially", but partial transesterification which stops significantly before transesterification of all available ester groups in a compound, is an embodiment of "partial" transesterification. In one embodiment, the lubricant contains a partially transesterified ricinoleic acid component that is substantially free of fully transesterified ricinoleic acid.

The derivative of ricinoleic acid expressed in Formula I is manufactured by the methods, techniques and processes described in PCT Pat. App. No. WO 02/10114 A2 (published Jul. 2, 2002) (to MJ Research & Development), U.S. Pat. No. 7,252,779 (issued Aug. 7, 2007) (to Mosier et al.), and U.S. Pat. No. 7,968,504 (issued Jun. 28, 2011) (to Mosier et al.), which are incorporated in their entirety by reference.

In an embodiment of the composition, $R_1$ is derived from transesterification of the ricinoleic acid with an alcohol having a carbon number in a range of from $C_1$ to $C_{18}$, preferably in a range of from $C_1$ to $C_{12}$, and more preferably in a range of from $C_1$ to $C_6$, which produces an alkyl extension from the former carboxylic acid functional group of ricinoleic acid. Examples of alcohols that are useful for providing a linear or branched alkyl radical comprising 1 to 18 carbon atoms include methyl alcohol, ethyl alcohol, butyl alcohol, t-butyl alcohol, pentyl alcohol, hexyl alcohol, heptyl alcohol, octyl alcohol, nonyl alcohol, decyl alcohol, dodecanol, isopropyl alcohol, n-propyl alcohol, substituted alcohols, and combinations thereof. An embodiment of the composition includes a derivative of ricinoleic acid that is n-propyl ricinoleate. In an embodiment, $R_1$ between different derivatives of ricinoleic acid has different linear or branched alkyl extensions. Such transesterified derivatives of ricinoleic acid can occur when a mixture of alcohols are used to transesterify the ricinoleic acid at the carboxylic acid site.

In an embodiment of the composition, $R_1$ is derived from transesterification of the ricinoleic acid with a compound having multiple alcohol functional groups, which produces an alkyl extension with at least one alcohol functionality from the former carboxylic acid functional group ricinoleic acid. An example of such compounds includes diols such as 1,4-butadiol and 1,6-hexadiol. Another example is glycerol, which contains three alcohol functional groups (a triol), and is typically produced with the production of fatty acids, including ricinoleic acid, from vegetable oils, including castor oil. An embodiment of the composition includes a derivative of ricinoleic acid that is a glyceryl ricinoleate. "Glyceryl ricinoleate" include glyceryl monoricinoleate, glyceryl diricinoleate, glyceryl triricinoleate and combinations thereof. In an embodiment, $R_1$ between different derivatives of ricinoleic acid has different linear or branched alkyl alcohol extensions. Such transesterified derivatives of ricinoleic acid can occur when a mixture of diols, triols or glycerols, or mixtures thereof, are used to transesterify the ricinoleic acid at the carboxylic acid site.

In an embodiment of the composition, $R_2$ is derived from transesterification of the ricinoleic acid with an acidic compound, which produces an ester extension from the former alcohol functional group of ricinoleic acid. The ester extension of the $R_2$ functional group depends on the acid type and can be organic, inorganic, or heterorganic and combinations thereof. Useful acids include acids that contain phosphorus, including phosphoric acid, phosphonic acid, phosphinic acid, isohypophosphoric acid, hypophosphoric acid, and polyphosphoric acids including for example pyrophosphoric acid, triphosphoric acid and trimetaphosphoric acid. When the acid contains a phosphate or a sulfate functional group, transesterified fatty esters result with an adjuvant or bonded functional group of the same. An embodiment includes where the transesterified derivative of ricinoleic acid product includes a transesterified derivative of ricinoleic acid with a phosphorus-containing ester functional group, such as a phosphate ester group. For example, if phosphoric acid transesterifies with the alcohol group, the ester extension will be $H_2PO_3$. If phosphorous acid transesterifies with the alcohol group, the ester extension will be $H_2PO_2$. If phosphinic acid transesterifies with the alcohol group, the ester extension will be $H_2PO$. If pyrophosphoric acid transesterifies with the alcohol group, the ester extension will be $H_3P_2O_6$. Examples of a transesterified derivative of ricinoleic acid with a phosphorus-containing ester functional group are phosphated ricinoleic acid derivatives, diphosphated ricinoleic acid derivatives, and diphosphated glyceryl ricinoleate.

Useful acids also include acids that contain sulfur, including sulfuric acid, polysulfuric acids, sulfonic acid, dodecylbenzene sulfonic acid, organic sulfonic acids, and sulfosalicylic acid. Examples of aromatic sulfonic acids include benzene-, toluene-, xylene and phenol sulfonic acids. An embodiment of the composition includes compounds where the transesterified derivative of ricinoleic acid product includes a transesterified derivative of ricinoleic acid with a sulfur-containing ester functional group, such as a sulfate ester group. For example, if sulfuric acid transesterifies with the alcohol group, the ester extension will be $HSO_3$.

Other useful acids include nitric acid, hydrochloric acid, acetic acid, butyric acid, isobutyric acid, gluconic acid, citric acid, formic acid, hydroxyacetic acid, hydroxybenzoic acid, and propionic acid. In an embodiment, $R_2$ is transesterified with a solid acid catalyst including but not limited to sulfated zirconia, tungstated zirconia, polyaniline sulfate, sulfated tin oxide, zeolite, resins, heteropolyacids, acidic ionic liquids and metal oxides.

In an embodiment of the composition, the transesterified derivative of ricinoleic acid does not include an ester extension that contains a halogen heteroatom.

Although transesterified derivatives of ricinoleic acid are the dominant fatty acid ester of the product, other fatty acid esters optionally are present in the transesterified derivative of ricinoleic acid product. Sources of ricinoleic acid and other fatty acids include vegetable oils such as castor oil, and in using natural sources for oils they contain a mixture of triglycerides of fatty acids. Unlike most oils, the fatty acids that are derived from castor oil through hydrolysis or saponification are fairly consistent in product with a high amount of ricinoleic acid, as shown in Table 1.

TABLE 1

A typical fatty acid product fraction derived from hydrolysis of castor oil.

| Fatty Acid | Amount (mole %) |
| --- | --- |
| Ricinoleic Acid | 85 to 95 |
| Linoleic Acid | 1 to 5 |
| Oleic Acid | 2 to 6 |
| Stearic Acid | 0.5 to 1.5 |
| Palmitic Acid | 0.5 to 1.5 |
| Dihydroxystearic Acid | 0.3 to 1.0 |
| Linolenic Acid | 0.3 to 1.0 |
| Eicosanoic Acid | 0.2 to 0.5 |

In an embodiment of the composition, the transesterified derivative of ricinoleic acid product includes transesterified derivatives of ricinoleic acid in a range of from about 88 to about 90 mole % of the product. Artificially refined vegetable oils have higher concentrations of ricinoleic acid. In an embodiment of the composition, the transesterified derivative of ricinoleic acid product includes transesterified derivatives of ricinoleic acid in a range of from about 88 to about 99 mole % of the product.

Fatty acid esters combine up to three reactive functional groups: uusaturation sites, alcohols and carboxylic acids. Other fatty acids present with ricinoleic acid compete for alcohol functional groups to transesterify with at their carboxylic acid functionality (similar to $R_1$ in Formula I), forming their own fatty acid esters. In addition, dihydroxystearic acid, which is present in caster oil, it has two hydroxyl groups that are operable to compete with ricinoleic acid to form esters at the $R_2$ site as given in Formula I. Finally, linoleic acid, oleic acid and linolenic acid also provide unsaturated carbons that can form the basis of saturation reactions. Examples of transesterified derivatives of fatty acids other than ricinoleic acid include phosphated oleic acid and phosphated glyceryl mono-oleate.

Drilling Fluid Lubricant

The drilling fluid lubricant is a mixture of the crude tall oil product and the transesterified derivative of ricinoleic acid product. The drilling fluid lubricant comprises crude tall oil product in a range of from about 50 vol. % to about 95 vol. %., more preferably in a range of from about 60 vol. % to about 90 vol. %, and the transesterified derivative of ricinoleic acid product in a range of from about 5 vol. % to about 50 vol. %, more preferably in a range of from about 10% to about 40% of the lubricant. The drilling fluid lubricant mixture is such that fatty acids and the fatty acid esters from the crude tall oil and the transesterified derivative of ricinoleic acid products combined are in a range of from about 50 vol. % to about 90 vol. % and that the rosin acids from the crude tall oil product are in a range of from about 10 vol. % to about 15 vol. % of the composition.

Embodiments of the drilling fluid lubricant can also contain other materials, including sterols, high molecular weight alcohols and other unsaponified matter.

Modified Drilling Fluids

The drilling fluid lubricant is useful in water-based muds. In an embodiment of the drilling fluid lubricant, a modified drilling fluid comprises a base drilling fluid in a range of from about 95 vol. % to about 99.9 vol. % and the drilling fluid lubricant in a range of from about 0.1 vol. % to about 5 vol. %.

Incorporating the drilling fluid lubricant into the base drilling fluid to form the modified drilling fluid does not require specialized mixing equipment that is unavailable to one that makes or uses drilling fluids. The drilling fluid lubricant can be slowly introduced into a portion, which is later incorporated into the remainder of the base drilling fluid, or the entire amount of base drilling fluid, can be introduced while being moderately agitated or mixed such that the drilling fluid lubricant is fully incorporated.

The improvement in the coefficient of friction for modified drilling fluid over the coefficient of friction for the base drilling fluid is significant. In an embodiment of the drilling fluid lubricant, the improvement in lubricity for the modified drilling fluid over the base drilling fluid is greater than 50%. In an embodiment, the improvement in lubricity for the modified drilling fluid over the base drilling fluid is greater than 60%. In an embodiment of the drilling fluid lubricant, the improvement in lubricity for the modified drilling fluid over the base drilling fluid is greater than 70%. In an embodiment of the drilling fluid lubricant, the improvement in lubricity for the modified drilling fluid over the base drilling fluid is greater than 90%. In an embodiment, the improvement in lubricity for the modified drilling fluid over the base drilling fluid is greater than 95%.

The presence of hydrocarbons within the modified drilling fluid may, in certain circumstances, detrimentally impact the lubricating effect of the drilling fluid lubricant. In an embodiment of the drilling fluid lubricant, the modified drilling fluid does not contain a detectable amount of petroleum material, which includes crude oil, a distilled fraction of crude oil, or heavy petroleum refinery liquid residues. In an embodiment of the drilling fluid lubricant, the modified drilling fluid is substantially free of petroleum material.

EXAMPLES

Examples of specific embodiments facilitate a better understanding of drilling fluid lubricants and the modified drilling fluids. In no way should the Examples limit or strictly define the scope of the invention.

Example 1

Several combinations of neat, comparative and embodiment modified drilling fluids were analyzed for lubricity and changes in lubricity given drilling fluid lubricant addition.

A standard water-based field mud (Neat Field Mud RC #6) was used as the basis for comparison of small additions of mineral oil from Graham, THERMOLUBE® from National Performance Solutions (Houston, Tex.), and a combination of THERMOLUBE® and crude tall oil. THERMOLUBE® is believed to contain at least a partially transesterified derivative of ricinoleic acid product. Crude tall oil (CTO) is the crude tall oil product. Combining THERMOLUBE® and the crude tall oil product produces an embodiment drilling fluid Lubricant.

The comparative and embodiment drilling fluid lubricants were added to aliquots of the base drilling mud at 1.5 vol % to form the comparative and embodiment modified drilling fluids seen in Table 2. Each drilling mud sample is stirred for 5 minutes on a multi-mixer to thoroughly incorporate the drilling fluid lubricants into the base drilling mud, forming the comparative and embodiment drilling fluids. The lubricity coefficients are determined using an OFI Digital EP/Lubricity tester. The results of testing are presented in Table 2.

TABLE 2

Comparison of modified WBM drilling fluids incorporating comparative and embodiment drilling fluid lubricants.

| Sample Drilling Mud Composition | Volume percentage of drilling mud samples | | | |
| --- | --- | --- | --- | --- |
| Neat Field Mud RC #6 | 100.0 | 98.5 | 98.5 | 98.5 |
| Mineral Oil | — | 1.5 | — | — |
| THERMOLUBE ® | — | — | 1.5 | — |
| THERMOLUBE ®/ CTO(25/75 vol./vol.) | — | — | — | 1.5 |
| Lubricity Coefficient | 0.308 | 0.307 | 0.104 | 0.107 |
| Percent Improvement over NFM RC #6 LC | — | 0.3 | 66.2 | 65.3 |

As seen in Table 2, the addition of mineral oil does not provide a substantial benefit in the reduction of lubricity over the base WBM at the 1.5 vol. % level. Both straight THERMOLUBE® as well as the THERMOLUBE®/crude tall oil (CTO) composition at the same level, however, provide a similar and significant reduction in the lubricity coefficient over the base WBM. An unexpected result is seen in that the majority amount of crude tall oil, which is a fairly inexpensive commodity, in the embodiment drilling fluid lubricant, provides almost an equivalent performance to the pure THERMOLUBE® material.

Example 2

Several combinations of neat, comparative and embodiment modified drilling fluids were analysed for lubricity and changes in lubricity given drilling fluid lubricant addition and temperature exposure over a period of time.

A water-based mud was formed using the ingredients given in Table 3 for comparing an "enhanced" mineral oil, THERMOLUBE®, and an embodiment drilling fluid lubricant. DRISPAC® SL is a soluble polymer from Drilling Specialties Co. (The Woodlands, Tex.).

TABLE 3

Example 2 water-based mud composition.
Base Drilling Mud Composition

| Material | Weight (g) |
|---|---|
| Water | 341.7 |
| Bentonite | 17.0 |
| Soda Ash | 0.3 |
| DRISPAC ® SL | 2.0 |
| SOLTEX ® | 1.0 |
| Xanthan gum | 0.25 |

The embodiment drilling fluid lubricant contains both at least a partially transesterified derivative of ricinoleic acid product (THERMOLUBE®) and a crude tall oil product (CTO) such that there is a mixture of fatty acids and fatty acid esters, especially the at least partially transesterified derivatives of ricinoleic acids, and rosin acids. The combination of fatty acids and fatty acid esters combined are in a range of from about 50 vol. % to about 90 vol. %, and the rosin acids from the crude tall oil product are in a range of from about 10 vol. % to about 15 vol. % of the embodiment drilling fluid lubricant. The mineral oil is labeled "EnerVest Enhanced Mineral Oil". Table 4 shows the sample preparation for the aging test. Each sample is prepared on a mixer.

TABLE 4

Example 2 comparative and embodiment drilling fluid compositions.

| | Base Drilling Mud | Volume of Lubricant (mL) |
|---|---|---|
| Enhanced Mineral Oil | 361.09 | 5.25 |
| THERMOLUBE ® | 361.11 | 5.25 |
| THERMOLUBE ®/CTO(25/75) | 361.04 | 5.25 |

Each of the comparative and embodiment drilling fluid compositions is tested for its resistance to torque and for its coefficient of friction (COF) both after formation (not aged) and after being hot-rolled at 150° F. for 16 hours (aged). The change in the COF relative to the performance of the base drilling mud (BDM) is also determined. The lubricity tests are performed on an OFI lubricity tester (OFI Testing Equipment, Inc., Houston, Tex.) at 60 RPM with 150 inch-lbs of applied torque for 5 minutes. The results of the tests are presented in Table 5.

TABLE 5

Torque values, coefficient of friction and change relative to the performance of the base drilling mud after mixing and after aging for 16 hours at 150° F.

| | Not Aged | | | Aged | | |
|---|---|---|---|---|---|---|
| | Torque Value | COF | COF change from BDM | Torque Value | COF | COF change from BDM |
| Base Drilling Mud | 23.7 | 0.237 | — | 22.8 | 0.228 | — |
| BDM + Enhanced Mineral Oil | 23.1 | 0.231 | 2.5 | 22.5 | 0.225 | 1.3 |
| BDM + THERMOLUBE ® | 16.8 | 0.168 | 29.1 | 10.8 | 0.108 | 52.6 |
| BDM + THERMOLUBE ®/CTO(25/75 v/v) | 3.4 | 0.034 | 85.7 | 0.1 | 0.010 | 95.6 |

Table 5 indicates that at equal volume amounts that the embodiment drilling fluid lubricant imparts significant enhancements to lower torque values and the coefficient of friction over both similar compositions of mineral oil and THERMOLUBE®. Unexpectedly, the inclusion of the crude tall oil product appears to have enhanced the lubricity of the embodiment modified drilling fluid (THERMOLUBE®/CTO 25/75 v/v) over that provided by THERMOLUBE® alone.

Also unexpectedly, both drilling fluids containing either THERMOLUBE® or the embodiment drilling fluid lubricant improved in both torque value and coefficient of friction testing after aging, whereas the mineral oil sample did not fare as well.

Example 3

A similar comparison test was run using a commercially available water-based field mud (BFM) from EnerVest (Houston, Tex.) in place of the BDM given in Table 3. All of the same mixing ratios, blending techniques and testing procedures are followed except for using the new base field mud. The results are presented in Table 6.

TABLE 6

Torque values, coefficient of friction and change relative to the performance of the base field mud after mixing and after aging for 16 hours at 150° F.

| Samples | Not Aged | | | Aged | | |
|---|---|---|---|---|---|---|
| | Torque Value | COF | COF change from BDM | Torque Value | COF | COF change from BDM |
| Ener Vest Base Field Mud | 35.1 | 0.351 | — | 32.7 | 0.327 | — |
| BFM + Enhanced Mineral Oil | 28.9 | 0.289 | 17.7 | 31.5 | 0.315 | 3.7 |
| BFM + THERMOLUBE ® | 20.0 | 0.200 | 43.0 | 6.4 | 0.064 | 80.4 |
| BFM + THERMOLUBE ®/CTO(25/75 v/v) | 9.8 | 0.098 | 72.1 | 2.8 | 0.028 | 91.4 |

Table 6 shows similar to Table 5 a significant enhancement to lower torque values and the coefficient of friction over both similar compositions of mineral oil and THERMOLUBE®. And, once again, like Example 2 shows in Table 5, both THERMOLUBE® and the embodiment drilling fluid lubricant (THERMOLUBE®/CTO 25/75 v/v) drilling fluids both improved in both torque value and coefficient of friction testing after aging.

Example 4

Several combination of neat, comparative and embodiment modified drilling fluids were analysed for lubricity and changes in lubricity given drilling fluid lubricant addition. The effect of adding a hydrocarbon fluid in addition to the embodiment drilling fluid lubricant was examined.

The base drilling mud for Example 4 is the same BDM as used in Example 2 and as stated in Table 3.

In this example, a first sample drilling fluid includes 99 vol. % BDM and 1 vol. % is THERMOLUBE®. A second sample drilling includes 98 vol. % BDM, 1 vol. % an embodiment drilling fluid lubricant similar to that used in Examples 2 and 3, and 1 vol. % commercially-available low sulfur diesel fuel. Other than what is stated, the same blending techniques and testing procedures are followed as in Examples 2 and 3 except the samples were not aged. The results are presented in Table 7.

TABLE 7

Torque values, coefficient of friction and change relative to the performance of the base drilling mud after mixing.

| Samples | Torque Value | COF | COF COF change |
|---|---|---|---|
| Base Drilling Mud | 27.0 | 0.270 | — |
| BDM + 1 vol. % THERMOLUBE ® | 7.1 | 0.071 | 73.7 |
| BFM + 1 vol. % THERMOLUBE ®/CTO (25/75 v/v) + 1 vol. % LSD | 9.6 | 0.096 | 64.4 |

The results of Table 7 indicate that the embodiment drilling fluid lubricant is sensitive to the presence of hydrocarbons in the drilling fluid composition. Even making a rough comparison with the data given in Table 5, which is not equivalent given that the amount of the embodiment drilling fluid lubricant has been reduced in Table 7, the results give an impression that the omission of a significant amount of hydrocarbons from an embodiment modified drilling fluid is preferable.

Example 5

Several combination of neat, comparative and embodiment modified drilling fluids were analyzed for apparent viscosity, plastic viscosity, yield point, lubricity and changes in lubricity given the amount of drilling fluid lubricant addition.

A water-based mud was formed using the ingredients given in Table 8 for comparing comparative and embodiment modified drilling fluids. The base drilling fluid and a base drilling fluid with THERMOLUBE® are comparative. The base drilling fluid with a mixture of THERMOLUBE® and a processed tall oil represents an embodiment of the modified drilling fluid. The processed tall oil (TO) is the crude tall oil product.

TABLE 8

Example 5 water-based mud composition.
Sample Drilling Mud Composition.

| Material | Units | Amount |
|---|---|---|
| Water | bbl | 0.8 |
| Bentonite | lb/bbl | 22.5 |
| Lignosulfonate | lb/bbl | 3.0 |
| Lignite | lb/bbl | 3.0 |
| Caustic Soda | lb/bbl | 1.5 |
| PACLV | lb/bbl | 0.5 |
| Revdust | lb/bbl | 50.0 |
| Barite | lb/bbl | 150.0 |

The comparative and embodiment drilling fluid lubricants were added to aliquots of the base drilling mud at 3 vol. % and 5 vol. % to form the comparative and embodiment modified drilling fluids seen in Table 9. Each drilling mud sample is stirred for 5 minutes on a multi-mixer to thoroughly incorporate the drilling fluid lubricants into the base drilling mud, forming the comparative and embodiment drilling fluids. The lubricity coefficients are determined using an OFI Digital EP/Lubricity tester. The results of testing are presented in Table 9.

TABLE 9

Comparison of modified WBM drilling fluids incorporating comparative and embodiment drilling fluid lubricants.

| Sample Drilling Mud Composition | Volume percentage of drilling mud | | | | | | |
|---|---|---|---|---|---|---|---|
| Table 8 WBM | 100.0 | 97.0 | 95.0 | 97.0 | 95.0 | 97.0 | 95.0 |
| THERMOLUBE ® | — | 3.0 | 5.0 | — | — | — | — |
| THERMOLUBE ®/TO (50/50 vol./vol.) | — | — | — | 3.0 | 5.0 | — | — |
| THERMOLUBE ®/TO (25/75 vol./vol.) | — | — | — | — | — | 3.0 | 5.0 |
| Testing Results | | | | | | | |
| Apparent Viscosity (cP) | 35.5 | 31.5 | 30.5 | 26.5 | 26.5 | 31 | 31.5 |
| Plastic Viscosity (cP) | 31 | 27 | 26 | 23 | 22 | 27 | 27 |
| Yield Point (lb/100 ft2) | 9 | 9 | 9 | 7 | 9 | 8 | 9 |
| Lubricity Coefficient | 0.286 | 0.210 | 0.188 | 0.008 | 0.006 | 0.026 | 0.019 |
| Percent Improvement over Table 8 WBM | — | 26.6 | 34.3 | 97.2 | 97.9 | 90.9 | 93.4 |

Table 9 presents several unexpected results from the comparison of THERMOLUBE® to embodiment drilling fluid lubricants continuing THERMOLUBE® and tall oil. First, although it was already shown in Tables 2, 5 and 6 that there was modification to the coefficient of friction of the embodiment modified drilling fluids, the results of Table 9 further demonstrate that the viscosities and yield points of the embodiment modified drilling fluids are not that different from the same variables of the base drilling fluid. This indicates that the lubricity of the drilling fluid can be successfully and significantly reduced by incorporating embodiment drilling fluid lubricants without negatively affecting the viscosity attributes of the drilling fluid, which may be important to other aspects of the drilling program such as maintaining fluid specific gravity with solids.

Second, the inclusion of tall oil as the crude tall oil product in the embodiment drilling fluid lubricant appears to have significantly enhanced the lubricity of the embodiment modified drilling fluid over that provided by THERMOLUBE® alone. The results of Table 9 indicate that there is a synergetic effect of the crude tall oil product used in Example 5 with the transesterified derivative of ricinoleic acid product that comprises the embodiment drilling fluid lubricants that significantly improves lubricity in water-based drilling fluids without detrimentally altering the viscosity profile of the base drilling fluid. Such an unexpected and synergetic effect is important if further process characteristics, including viscosity, are not to be modified due to other properties of the drilling fluid.

What is claimed is:

1. A drilling fluid lubricant comprising:
a crude tall oil product having a viscosity of 29 centipoise at a temperature of 25° C. and a pressure of 1 atmosphere; and
a derivative of ricinoleic acid that is at least partially transesterified product from a reaction of ricinoleic acid with propyl alcohol in the presence of a phosphorus containing acid having a viscosity in a range of from 30 to 500 centipoise at a temperature of 40° C. and a pressure of 1 atmosphere, wherein the volume ratio of the derivative of ricinoleic acid to the crude tall oil product is between about 1:1 to about 1:3, and wherein the derivative of ricinoleic acid is present at about at least 10 vol. % of the drilling fluid lubricant.

2. The drilling fluid lubricant of claim 1, where the drilling fluid lubricant comprises fatty acids and fatty acid esters that combined are in a range of from 50 vol. % to 90 vol. % and rosin acids that are in a range of from 10 vol. % to 15 vol. % of the drilling fluid lubricant.

3. The drilling fluid lubricant of claim 1, where the crude tall oil product is crude tall oil having a fatty acid ratio to rosin acid ratio in a range of from 2:1 to 1:3.

4. The drilling fluid lubricant of claim 1, where the crude tall oil product is selected from the group consisting of crude tall oil, distilled tall oil, acid tall oil, fractionated tall oil, and combinations thereof.

5. The drilling fluid lubricant of claim 1, where the at least partially transesterified derivative of ricinoleic acid product comprises at least partially transesterified derivatives of ricinoleic acid that combined are in a range of from 88 mole % to 99 mole % of the product.

6. The drilling fluid lubricant of claim 1, where the derivative of ricinoleic acid that is at least partially transesterified product contains the following at least partially transesterified derivative of ricinoleic acid:

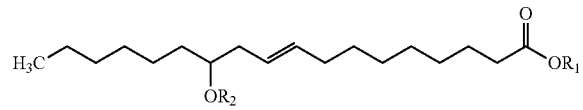

where $R_1$ is selected from the group consisting of a hydrogen atom, a linear, branched, cyclical and polycyclical alkyl radical comprising 1 to 18 carbon atoms, a linear, branched, cyclical and polycyclical alkyl alcohol radical comprising 1 to 18 carbon atoms, or a glyceride radical;
where $R_2$ is selected from the group consisting of a hydrogen atom, a phosphorous radical comprising 1 to 2 phosphorous atoms, a sulfur radical comprising 1 to 2 sulfur atoms, or a nitrogen radical comprising 1 nitrogen atom; and
where $R_1$ and $R_2$ are both not hydrogen.

7. The drilling fluid lubricant of claim 6, where the derivative of ricinoleic acid does not include an ester extension with a halogen heteroatom.

8. The drilling fluid lubricant of claim 6, where the derivative of ricinoleic acid that is at least partially transesterified product includes n-propyl ricinoleate and glyceryl ricinoleate.

9. The drilling fluid lubricant of claim 6, where the derivative of ricinoleic acid that is at least partially transesterified product includes a partially transesterified derivative of ricinoleic acid that contains a phosphorus-containing ester functional group.

10. The drilling fluid lubricant of claim 6, where the derivative of ricinoleic acid that is at least partially transesterified product includes a partially transesterified derivative of ricinoleic acid that contains a sulfur-containing ester functional group.

11. The drilling fluid lubricant of claim 6, where the derivative of ricinoleic acid that is at least partially transesterified product includes a fully transesterified derivative of ricinoleic acid that contains a phosphorus-containing ester functional group.

12. The drilling fluid lubricant of claim 6, where the derivative of ricinoleic acid that is at least partially transesterified product is a fully transesterified derivative of ricinoleic acid that contains a sulfur-containing ester functional group.

* * * * *